United States Patent
Roepke

(10) Patent No.: US 6,932,660 B2
(45) Date of Patent: Aug. 23, 2005

(54) CONTACT ARRANGEMENT WITH AN ELECTRICAL PLUG CONNECTION

(75) Inventor: Stefan Roepke, Schwabmuenchen (DE)

(73) Assignee: Robert Bosch GmbH, Stuttgart (DE)

( * ) Notice: Subject to any disclaimer, the term of this patent is extended or adjusted under 35 U.S.C. 154(b) by 19 days.

(21) Appl. No.: 10/886,337

(22) Filed: Jul. 7, 2004

(65) Prior Publication Data

US 2005/0014423 A1 Jan. 20, 2005

(30) Foreign Application Priority Data

Jul. 10, 2003 (DE) .......................................... 103 31 229

(51) Int. Cl.$^7$ .............................................. H01R 11/22
(52) U.S. Cl. ..................................................... 439/856
(58) Field of Search ................................ 439/856–857, 439/342, 70, 525, 82, 61, 65, 861, 495, 862

(56) References Cited

U.S. PATENT DOCUMENTS

| 4,085,998 | A | * | 4/1978 | Owens ........................ 439/856 |
| 4,795,379 | A | * | 1/1989 | Sasaki et al. ............... 439/856 |
| 4,995,814 | A | * | 2/1991 | Weidler ........................ 439/61 |
| 6,224,432 | B1 | * | 5/2001 | Billman ...................... 439/856 |
| 6,402,571 | B1 | * | 6/2002 | Muller et al. ............... 439/745 |
| 6,478,599 | B1 | * | 11/2002 | McHugh et al. ............. 439/342 |

* cited by examiner

Primary Examiner—J. F. Duverne
(74) Attorney, Agent, or Firm—Michael J. Striker

(57) ABSTRACT

A contact arrangement for providing an electrical plug connection between an electrical device and an exchangeable storage battery for a current supply of the electrical device has a plug part having at least one contact tong with two oppositely located contact surfaces, a receiving part having at least two oppositely located contact fingers between which the contact tong of the plug part is insertable, the contact fingers at one end being clamped and elastically bendable for clamping at another free end being clamped between the contact fingers of the contact tong in an inserted condition, the contact fingers being bent relative to one another in a configuration from the group consisting at an angle and convexly and being pressed with a contact surface arranged at an apex of a bending against a neighboring contact surface of the contact tong, the apexes of the both contact fingers being offset relative to one another in an insertion direction of the contact tong and overlapping before the insertion of the contact tong when considered in the insertion direction.

11 Claims, 4 Drawing Sheets

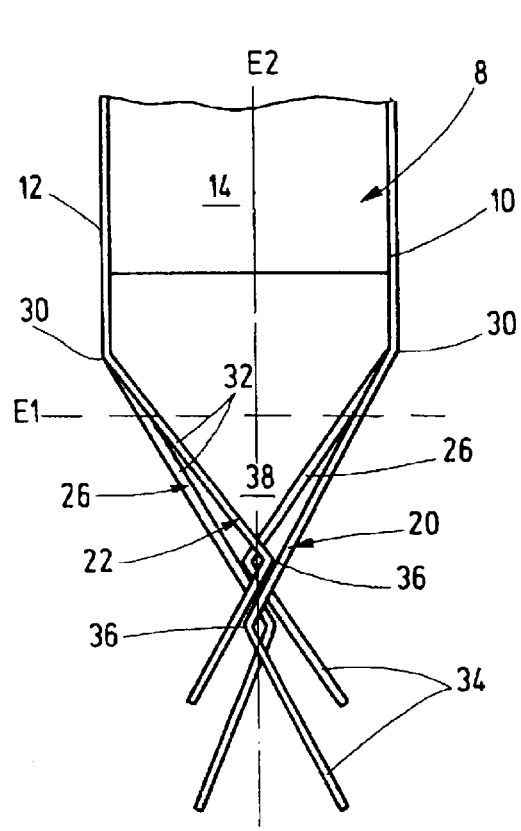
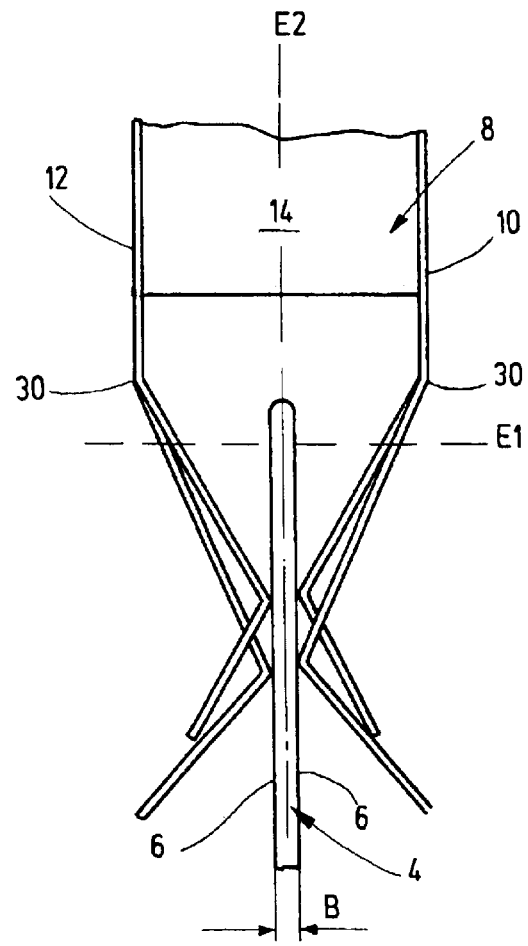
Fig. 2
Fig. 3

CONTACT ARRANGEMENT WITH AN ELECTRICAL PLUG CONNECTION

BACKGROUND OF THE INVENTION

The present invention relates to a contact arrangement with an electrical plug connection, in particular with a plug connection between an electrical device and an exchangeable storage battery for current supply of the electrical device.

The invention also deals with an electrical device which is provided with an exchangeable storage battery for current supply and such a contact arrangement.

Contact arrangements of the above mentioned general type are used for network-independent electrical tools, to provide an electrical connection between the storage battery during the use of a charge storage battery in an electrical tool on the one hand, and to provide a current circuit of an electrical drive motor of the electric tool. The storage battery for this purpose has two contact tongs which are arranged on one plug part and are inserted in a receiving part of the electric tool between an oppositely located pair of tulip- or contact fingers of a so-called tulip contact.

The oppositely located contact fingers which are connected at their ends rigidly with a base body of the tulip contact have diverging free end portions, for the insertion of the contact tongs, to facilitate the insertion of the contact tongs between the contact fingers. The oppositely located elastically bendable contact fingers are angled or bent convexly between their free ends and the base body, so that their distance in the region of the apex of the angle or bends is the smallest. At this location the light width (clearance) of an intermediate space for receiving the contact tongs between the both contact fingers is smaller than the corresponding transverse cross-section of the contact tong, or the contact finger located there opposite to it. Thereby the contact surfaces of the contact fingers arranged on the apex are pressed against the corresponding neighboring contact surface of the contact tong, to guarantee a good contact and to fix the contact tong between the oppositely located contact fingers.

In the currently utilized contact arrangements, the apexes of the angles or bends are located exactly opposite to the oppositely located contact fingers. During the use of the contact tongs with a small cross-sectional dimension this results in that, without a utilization of special materials no sufficient clamping forces can be produced when the contact fingers, before the insertion of the contact tongs in the region of the apex, abut against one another without pressure. For increasing the clamping forces, it is however possible to impart a pretensioning to the oppositely located contact fingers, so that in the region of their apex, they are pressed against one another under pressure, when the contact tongs are pulled from the intermediate space between the contact fingers. The contact fingers with a pretensioning provided within a predetermined tolerance field are however more difficult to manufacture. Moreover, it is not possible to guarantee a sufficient clamping force for quality testing by a visual control or another simple measures, since they can not be measured with the pretensioned contact fingers or can be measured only with certain difficulties.

SUMMARY OF THE INVENTION

Accordingly, it is an object of the present invention to provide a contact arrangement with an electrical plug connection, which avoids the disadvantages of the prior art.

More particularly, it is an object of the present invention to provide a clamping arrangement with an electrical plug connection which has the advantage that a higher clamping force can be obtained, since the corresponding oppositely located contact fingers can overlap due to the offset of their apexes in the insertion direction of the contact tongs in the initial position, or in other words with pulled out contact tongs, whereby the magnitude of the deviation of the contact fingers between the initial position and the clamping position, or in other words with the inserted contact tongs, and thereby also the intensity of the clamping force can be increased without a pretensioning.

While in the known contact arrangements, the sum of the deviations of the both apexes transversely to the insertion direction of the contact tongs during the insertion of the latter corresponds maximum to the transverse dimension of the contact tongs, this sum in the inventive contact arrangement can be increased to 1.5–2 times of the transverse dimension of the contact tongs or more, depending how great the overlapping of the apexes is provided. This means that the transverse cross-section measurement of the contact tongs is designed with the consideration of a sufficient strength, and thereby in some cases can be reduced, since an average dimension is not required for reaching a predetermined deviation and thereby clamping force.

Moreover, the maintaining of the predetermined clamping force with simple means by a visual control or another optical process is testable when the contact fingers in accordance with a preferable embodiment of the present invention in the initial position do not contact one another or abut against one another not under pressure and thereby are designed so that during the quality testing over an optical path it is determined whether the unloaded contact fingers in their initial position assume a predetermined position or position relationship or not. Though the contact fingers before the insertion of the contact tongs can already abut against one another to increase the clamping force or pressed against one another with pretensioning, when very high clamping forces are desired.

In accordance with a preferable embodiment of the present invention, the both contact fingers are angled in the region of the apex, wherein the both contact finger portions connected to the apex diverge substantially rectilinearly. In this manner, with the smallest possible space use, an especially great deviation of the contact fingers between the initial- and the clamping position can be provided, when both contact fingers in their initial position extend substantially parallel to one another in the region between their offset apexes in a small distance. Alternatively the contact fingers can be however bent convexly, wherein the contact finger portions connected at both sides to the apex have the same or changing curvature radius or transit in direction of the both ends of the contact fingers in two rectilinear portions.

In order to avoid that the offset apexes due to differently long lever arms and differently great pressing forces with the same material thickness apply a great one-side moment to the contact tongs, preferably several pairs of oppositely located contact fingers are arranged near one another. Preferably, the apexes the contact fingers which are arranged near one another are offset relative to one another at each side of the contact tongs alternatingly in insertion direction. With the use of the contact fingers which are formed substantially symmetrically in an end side view relative to a central plane of the contact tongs, the moments apply to the contact tongs are substantially compensated.

In order to avoid that the free end portions of the both contact fingers of each pair project differently far to the side, in accordance with a further preferable embodiment of the present invention the contact fingers have a different length. Always such a contact finger is shorter, with which the apex is located closer to the clamped end. Preferably, the neighboring contact fingers at each side of the contact tong are alternatingly longer and shorter, wherein longer contact fingers are located opposite to the shorter contact fingers, and the shorter contact fingers are located opposite to the longer contact fingers.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a partially broken end side view of the tulip contact before an insertion of the contact tong;

FIG. 3 is a partially broken end side view of the tulip contact during the insertion of the contact tong;

DESCRIPTION OF THE PREFERRED EMBODIMENTS

Figure 1:
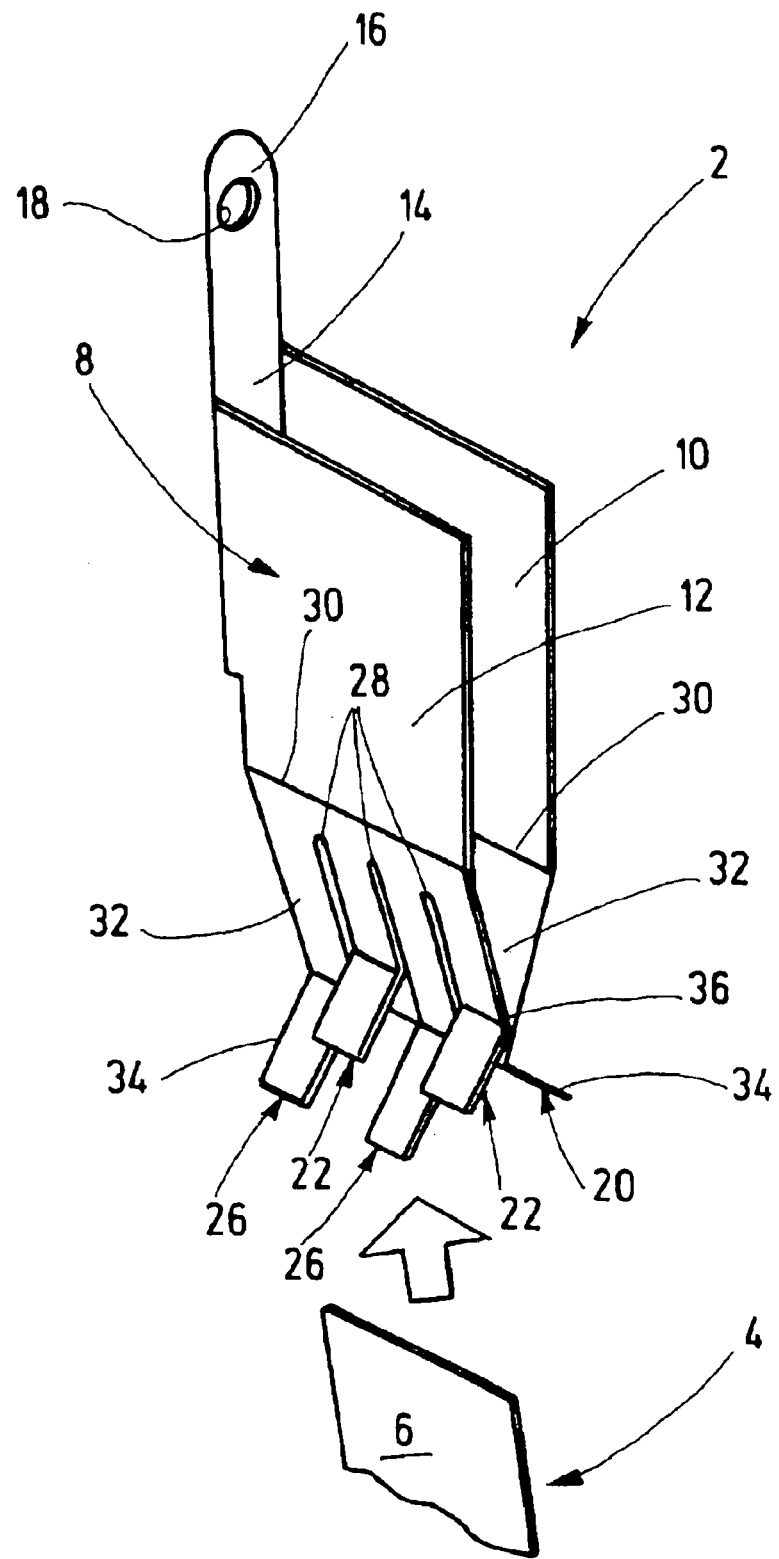
FIG. 1 is a perspective view of a tulip contact for contacting a contact tong of a storage battery of a hand-held electric tool.

Metallic tulip contacts 2 shown in the drawings are used for providing a current circuit for power supply of an electric drive motor of a hand-held electric tool, such as for example a power drill, a hammer drill, a vibration grinder or the like, to be connected with an exchangeable storage battery to provide a network-independent power supply of the electric tool.

In a known manner the storage battery has a plug part which, for mounting of the storage battery on the electric tool and for producing an electrical connection between the storage battery and the electric tool, is inserted in a receiving part arranged at the lower end of the handle of the electric tool, which together with the plug part forms a plug connection. The plug part of the storage battery is provided with two projecting contact tongs 4 (only one is shown) which form a positive pole and a negative pole and each formed as a thin rectangular plate with a relatively small transverse cross-sectional dimension B. The foot of the contact tong 4 is anchored in the storage battery, while its both oppositely located flat and parallel wide side surfaces 6 form contact surfaces, which during insertion of the plug part into the receiving part, are in contact with one of the tulip contacts 2.

Each tulip contact 2 of the electric tool produced by punching out and bending from a metal sheet with high conductive properties and high corrosion resistance, includes substantially a body part 8 which is U-shaped in a horizontal cross-section, with parallel legs 10 and 12 connected with one another at one of the end sides of the tulip contact 2 by a yoke 14, a contact strip 6 extending upwardly beyond the yoke 14 with an opening 18, which is used for soldering of a cable for producing an electrically conductive connection between the tulip contact 2 and the current circuit of the drive motor of the electric tool, and several pairs of elastically bendable contact fingers 20, 22 located opposite to one another, between which the contact tong 4 of the storage battery is clamped during insertion of the plug part into the receiving part. For mounting in the receiving part of the electric tool, the tulip contact 2 can be inserted directly into a correspondingly shaped receptacle in the receiving part or can be engaged first in a contact holder (not shown) which is then inserted in the receptacle.

The contact fingers 20, 22, 24, 26 which project downwardly beyond the both legs 10, 12 of the body part 8 are clamped at one side, or in other words are connected at their upper ends 24 of one piece with the legs 10, 12 of the rigidly mounted body part 8, which in the region of the upper ends of the contact fingers 20, 22, 24, 26 are no longer connected by the yoke 14 to impart a high elasticity to the contact fingers 20, 22, 24, 26. The corresponding neighboring contact fingers 20, 24 or 22, 26 of each leg are separated by slots 28, which before the bending of the tulip contact 2 are punched out from the metal sheet.

The slots can extend rectilinearly along the contact fingers 20, 22, 24, 26 up to their free lower ends, so that the contact fingers 20, 22, 24, 26 have the same cross-sectional dimensions over their whole length. Since the tulip contacts 2 are delivered as bulk products, the slots however also have narrowings to prevent hooking of the contact fingers 20, 22, 24, 26 of several tulip contacts. The upper ends of the slots 28 are located in a horizontal plane E1 at a small distance under two bending lines 30 extending over the whole width of the legs 10, 12, on which the lower ends of the legs 10, 12 are to be bent on one another, so that they converge downwardly.

Figure 4:
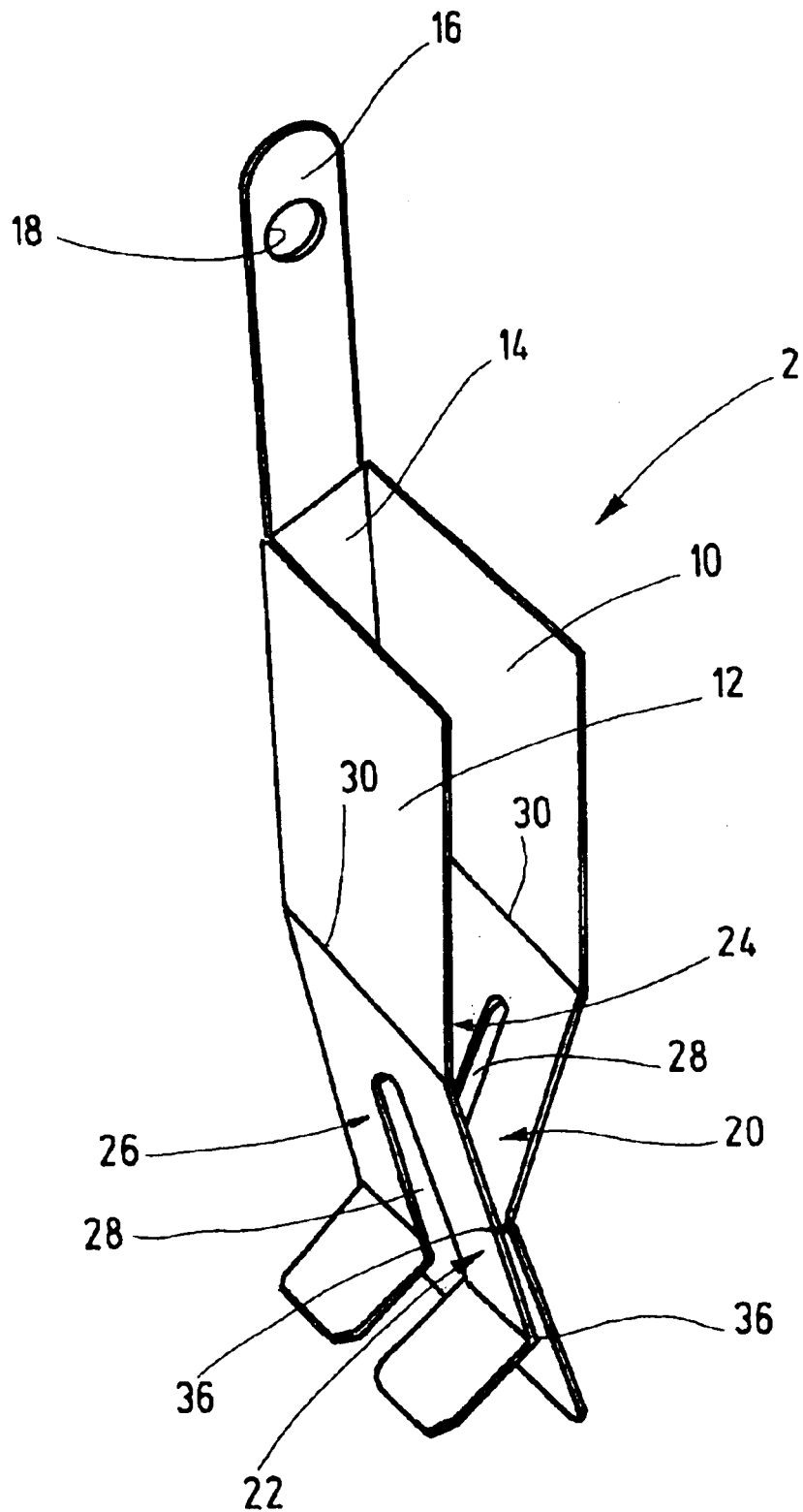
FIG. 4 is a perspective view of a further tulip contact with another contact finger arrangement.

As can be seen from FIGS. 2 and 4, each of two contact fingers 20, 22, 24, 26 located in pairs opposite to one another is bent in an angular shape, wherein rectilinear upper portions 32 of the contact fingers 20, 22, 24, 26 which adjoin the legs 10, 12 converge in the extension of the legs 10, 12 downwardly while their rectilinear lower portions 34 which also adjoin the free ends diverge downwardly in direction of the free ends, to facilitate the insertion of the contact tongs 4 from below between the free ends of the contact fingers 20, 24, and 22, 26.

An apex 36 is provided at the angularly bent transition between the upper and the lower portions 32, 34 of each contact finger 20, 22, 24, 26. The inner surface of the apex 36 which faces the opposite contact finger 20, 22, 26, 24 forms the contact surface. A contact with the neighboring contact surface 6 of the contact tong 4 is produced on this contact surface after the insertion of the contact tong 4 into an intermediate space 8 which is limited at the side by all contact fingers 20, 22, 24, 26.

For increasing the clamping force with which the contact tongs 4 are clamped after the insertion between the pair of the opposite contact fingers 20, 22, 24, 26, the apexes 36 of each pair of the oppositely located contact fingers 20, 22, or 24, 26 are offset relative to one another in the insertion direction of the contact tongs 4. In other words, the distance between the base body 8 or the plane E1 and the corresponding apex 36 is differently great. Moreover, the both apexes of each pair of the oppositely located contact fingers 20, 22, or 24, 26 overlap before the insertion of the contact tongs 4 in the insertion direction.

In the shown embodiments it is clear that the apex 36 of each contact finger 20, 22, 24, 26 is arranged with respect to its upper and lower end at each side of a vertical central plane E2 of the base body 8 which coincides with the central plane of the inserted contact tong 4. In the embodiments shown in FIGS. 1–3 the overlapping corresponds substantially to the cross-sectional dimension B of the contact tong 4, while the transverse cross-section dimension B of the contact tong 4 in the embodiments of FIGS. 4 and 5 amounts to substantially more than double this cross-sectional dimension B.

In both embodiments the respective oppositely located contact fingers 20, 22, or 24, 26 are oriented substantially parallel to one another before the insertion of the contact tongs 4 in the region between the offset apexes 36, and they have there a small distance so that in their initial position they are neither in contact with one another nor are loaded for bending. This allows to test the maintenance of a desired position and position relationship of the contact fingers 20, 22, 24, 26 for a quality testing, for example by a visual control.

Figure 5:
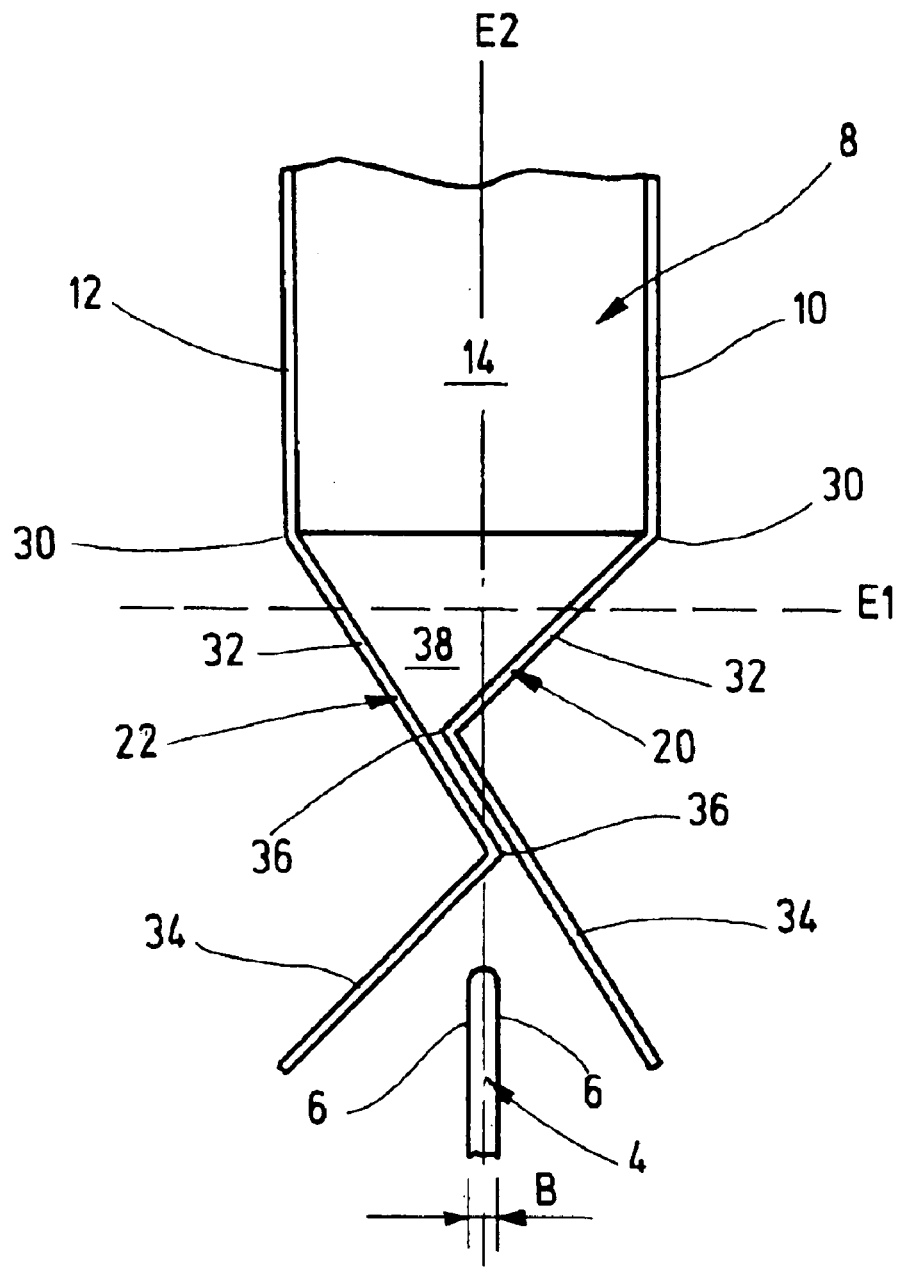
FIG. 5 is a partially broken end side view of the tulip contact of FIG. 4, before the insertion of the contact tong.

In the embodiments of FIGS. 4 and 5, the correspondingly oppositely located contact fingers 20, 22, or 24, 26 have substantially identical lengths, wherein each portion 22 located above the apex 36 of one of the contact fingers 20, 24 of each pair is longer and the portion 34 located under the apex 36 is shorter, while this is opposite with the other contact finger 22, 26 of each pair. Moreover, the portion 32 located above the apex 36 of one contact finger 22, 26 of each pair is inclined steeper than the corresponding portion 32 of the oppositely located contact finger 20, 24, while in another contact finger 20, 24, the portion 34 between the apex 32 and the free end is steeper than the corresponding portion 34 of the oppositely located contact finger 22, 26. Four contact fingers 20, 22, 24, 26, are provided as a whole and they are located opposite to one another in pairs. The apexes 36 of the contact fingers 20, 24 and 22, 26 coincide with one another at each side of the contact tong 4. It can be seen from consideration of FIG. 5 that the contact fingers 20, 22, 24, 26, before and after the insertion of the contact tong 4, are formed asymmetrical with respect to the vertical central plane E2 of the tulip contact.

In contrast to this, in the embodiment of FIGS. 1–3 the correspondingly oppositely located contact fingers 20, 22, or 24, 26 have different lengths. Generally, the two pairs each having four contact fingers 20, 22, 24, 26, are arranged near one another. The contact fingers 20, 24, or 22, 26, located at each side of the contact tong 4 have apexes 36 that are offset alternatingly in the insertion direction and in addition are alternatingly longer and shorter. Each longer contact finger 22, 26 is located opposite to a shorter contact finger 22, 24. In the end side view of FIGS. 2 and 3 it can be seen that the contact fingers 20, 22, 24, 26 before and after the insertion of the contact tongs are formed substantially asymmetrical to the vertical central plane E2 of the tulip contact 2 and correspondingly the inclination of the upper portion 32 or the lower portion 34 of the oppositely located contact fingers 20, 22 and 24, 26 is identical.

It will be understood that each of the elements described above, or two or more together, may also find a useful application in other types of constructions differing from the types described above.

While the invention has been illustrated and described as embodied in contact arrangement with an electrical plug connection, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

What is claimed is:

1. A contact arrangement for providing an electrical plug connection between an electrical device and an exchangeable storage battery for a current supply of the electrical device, comprising a plug part having at least one contact tong with two oppositely located contact surfaces; a receiving part having at least two oppositely located contact fingers between which said contact tong of said plug part is insertable, said contact fingers at one end being clamped and elastically bendable for clamping at another free end between said contact fingers of said contact tong in an inserted condition, said contact fingers being bent relative to one another in a configuration selected from the group consisting at an angle and convexly and being pressed with a contact surface arranged at an apex of a bending, against a neighboring contact surface of said contact tong, said apexes of said both contact fingers being offset relative to one another in an insertion direction of said contact tong and overlapping before the insertion of said contact tong when considered in the insertion direction.

2. A contact arrangement as defined in claim 1, wherein said apexes of said both contact fingers overlap over more than 1.5 times their material thicknesses.

3. A contact arrangement as defined in claim 1, wherein said both contact fingers before the insertion of said contact tong are in a condition selected from the group consisting of not contacting with one another and being pressed relative to one another with a pretensioning.

4. A contact arrangement as defined in claim 1, wherein said both contact fingers before the insertion of said contact tong are in a condition selected from the group consisting of contacting with one another and being pressed relative to one another with a pretensioning.

5. A contact arrangement as defined in claim 1, wherein said both contact fingers, before the insertion of the contact tong, extend in a region between said apexes substantially parallel to one another.

6. A contact arrangement as defined in claim 1, wherein said both contact fingers have end portions provided between said apexes and the free ends, said end portions being divergent end portions and being differently long.

7. A contact arrangement as defined in claim 1, wherein an at least two said contact fingers are arranged near one another at each side of said contact tong.

8. A contact arrangement as defined in claim 7, wherein said apexes of the two contact fingers arranged near one another at one side of said contact tong are offset relative to one another in the insertion direction of said contact tong.

9. A contact arrangement as defined in claim 7, wherein said apexes of two of said contact fingers arranged near one another at one side of said contact tong are located in one plane in the insertion direction of the contact tong.

10. A contact arrangement as defined in claim 7, wherein said contact fingers arranged near one another at one side of said contact tong are alternatingly longer and shorter, so that said longer contact finger is located opposite to said short contact finger, while said shorter contact finger is located opposite to said longer contact finger.

11. An electrical apparatus, comprising an electrical device; an exchangeable storage battery for current supply of said electrical device; and a contact arrangement for providing a plug connection between said electrical device and said exchangeable storage battery, said contact arrangement including a plug part having at least one contact tong with two oppositely located contact surfaces; a receiving part having at least two oppositely located contact fingers between which said contact tong of said plug part is insertable, said contact fingers at one end being clamped and elastically bendable for clamping at another free end between said contact fingers of said contact tong in an inserted condition, said contact fingers being bent relative to one another in a configuration selected from the group consisting at an angle and convexly and being pressed with a contact surface arranged at an apex of a bending against a neighboring contact surface of said contact tong, said apexes of said both contact fingers being offset relative to one another in an insertion direction of said contact tong and overlapping before the insertion of said contact tong when considered in the insertion direction.

* * * * *